(12) United States Patent
Asadi et al.

(10) Patent No.: US 12,306,715 B1
(45) Date of Patent: May 20, 2025

(54) MIN-SUM DECODING FOR IRREGULAR LOW-DENSITY PARITY CHECK CODES IN MEMORY DEVICES

(71) Applicant: SK hynix Inc., Icheon-si (KR)

(72) Inventors: Meysam Asadi, San Jose, CA (US); Fan Zhang, Fremont, CA (US); Hongwei Duan, Cupertino, CA (US)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 18/410,939

(22) Filed: Jan. 11, 2024

(51) Int. Cl.
*G06F 11/10* (2006.01)

(52) U.S. Cl.
CPC ................. *G06F 11/1076* (2013.01)

(58) Field of Classification Search
None
See application file for complete search history.

(56) References Cited

U.S. PATENT DOCUMENTS

| | | | |
|---|---|---|---|
| 7,376,885 B2 | 5/2008 | Richardson et al. | |
| 8,230,298 B2 | 7/2012 | Tran et al. | |
| 8,984,365 B1* | 3/2015 | Norrie | H03M 13/1111 714/755 |
| 9,015,550 B2 | 4/2015 | Wang et al. | |
| 11,316,532 B1* | 4/2022 | Hsu | H03M 13/1145 |
| 2005/0204271 A1* | 9/2005 | Sharon | H03M 13/3738 714/801 |
| 2005/0283707 A1* | 12/2005 | Sharon | H03M 13/635 714/758 |
| 2010/0042902 A1* | 2/2010 | Gunnam | H03M 13/1142 708/207 |
| 2014/0122979 A1* | 5/2014 | Chen | H03M 13/116 714/779 |
| 2016/0233883 A1* | 8/2016 | Sedighi | H03M 13/1122 |
| 2019/0097656 A1* | 3/2019 | Bhatia | H03M 13/1117 |

OTHER PUBLICATIONS

F. Gutierrez, G. Corral-Briones, D. Morero, T. Goette and F. Ramos, "FPGA implementation of the parity check node for min-sum LDPC decoders," 2012 VIII Southern Conference on Programmable Logic, Bento Gonçalves, Brazil, 2012, pp. 1-6, (Year: 2012).*

* cited by examiner

*Primary Examiner* — Daniel F. McMahon
(74) *Attorney, Agent, or Firm* — Perkins Coie LLP

(57) ABSTRACT

Devices, systems, and methods for improving performance of an iterative decoder in a non-volatile memory are described. An example method includes receiving a noisy codeword that is based on a transmitted codeword generated from an irregular low-density parity-check (LDPC) code, performing, in a first mode of the iterative decoder and on the noisy codeword for a number of iterations, a message passing algorithm between multiple variable nodes and multiple check nodes that represent a parity matrix of the irregular LDPC code, and determining, subsequent to performing the number of iterations, a candidate version of the transmitted codeword. In this first mode, and as part of performing the message passing algorithm, at least one check node of the multiple check nodes is configured to store a portion of multiple check node parameters instead of all of the multiple check node parameters.

20 Claims, 8 Drawing Sheets

MIN-SUM DECODING FOR IRREGULAR LOW-DENSITY PARITY CHECK CODES IN MEMORY DEVICES

TECHNICAL FIELD

This patent document generally relates to non-volatile memory devices, and more specifically, to low-density parity-check codes used in non-volatile memory devices.

BACKGROUND

Data integrity is an important feature for any data storage device and data transmission. Use of strong error-correction codes (ECCs) is recommended for various types of data storage devices including NAND flash memory devices. Solid-state drives (SSDs) use multi-level NAND flash devices for persistent storage. However, multi-level NAND flash devices can be inherently unreliable and generally need to use ECCs to allow dramatic increase in data reliability at the expense of extra storage space and computational resources for ECC parity bits. There is a demand for ECCs that can provide high-throughput implementations.

SUMMARY

Embodiments of the disclosed technology relate to methods, systems, and devices that improve performance of a block of a memory device that uses a low-density parity check (LDPC) code. In an example, the performance of the memory device is improved by doubling the throughput of the min-sum decoder of the LDPC code. The improved decoder can provide an increased throughput, which can advantageously meet storage reliability requirements, when a bit-flipping decoder cannot provide sufficient throughput.

In one example, a method for improving performance of a memory device is described. The method includes receiving a noisy codeword that is based on a transmitted codeword generated from an irregular low-density parity-check (LDPC) code, and performing, in a first mode of the iterative decoder and on the noisy codeword for a number of iterations, a message passing algorithm between a plurality of variable nodes and a plurality of check nodes that represent a parity matrix of the irregular LDPC code. In this first mode, and as part of performing the message passing algorithm, at least one check node of the plurality of check nodes is configured to receive each of a plurality of messages from a corresponding variable node of a subset of the plurality of variable nodes connected to the at least one check node, each of the plurality of messages comprising a sign and a magnitude, identify (i) a first minimum value corresponding to a smallest magnitude amongst the plurality of messages, (ii) a second minimum value, greater than the first minimum value, corresponding to a second smallest magnitude amongst the plurality of messages, (iii) a first index of the corresponding variable node associated with the first minimum value, and (iv) a second index of the corresponding variable node associated with the second minimum value, and store (i) a magnitude of the first minimum value, (ii) a difference between a magnitude of the second minimum value and the magnitude of the first minimum value, and (iii) the first index for the first minimum value. The method then includes determining, subsequent to performing the number of iterations, a candidate version of the transmitted codeword.

In another example, the methods may be embodied in the form of an apparatus that includes a processor and a memory coupled to the processor.

In yet another example, the methods may be embodied in the form of processor-executable instructions and stored on a computer-readable program medium.

The subject matter described in this patent document can be implemented in specific ways that provide one or more of the following features.

DETAILED DESCRIPTION

Solid-state drives (SSDs) are a new generation of storage device used in computers. SSDs replace traditional mechanical hard disks by using flash-based memory, which is significantly faster. SSDs speed up computers significantly due to their low read-access times and fast throughputs. SSDs can be configured to use low-density parity-check (LDPC) codes to correct any bit-errors in pages read from NAND media. LDPC codes are used to ensure data integrity in storage systems that use the new generation of NAND flash memories.

General irregular LDPC codes have been gaining popularity due to them having the highest error correction capability (to meet a specific reliability requirement), and iterative decoders have been used to meet the throughput requirement. Iterative decoders for LDPC codes have a wide range of complexities. The two primary types of decoders are the low-complexity bit-flipping (BF) decoder with low error-correction capability and the high-complexity min-sum (MS) decoder with high error-correction capability. Furthermore, BF decoder performance (both correction and convergence) is known to be suboptimal for irregular codes (and especially for codes with a large portion of low column weights), and thus, embodiments of the disclosed technology provide implementations of the MS decoder that can handle different throughputs.

This patent document first overviews an example of a non-volatile memory system in which an MS decoder can be implemented to decode irregular LDPC codes, and then describes methods, systems and devices to increase the throughput of the MS decoder by, for example, reducing the bit-width of the metrics being processed and not processing certain metrics.

FIGS. 1-6 overview a non-volatile memory system (e.g., a flash-based memory, NAND flash) in which embodiments of the disclosed technology may be implemented.

Figure 1:
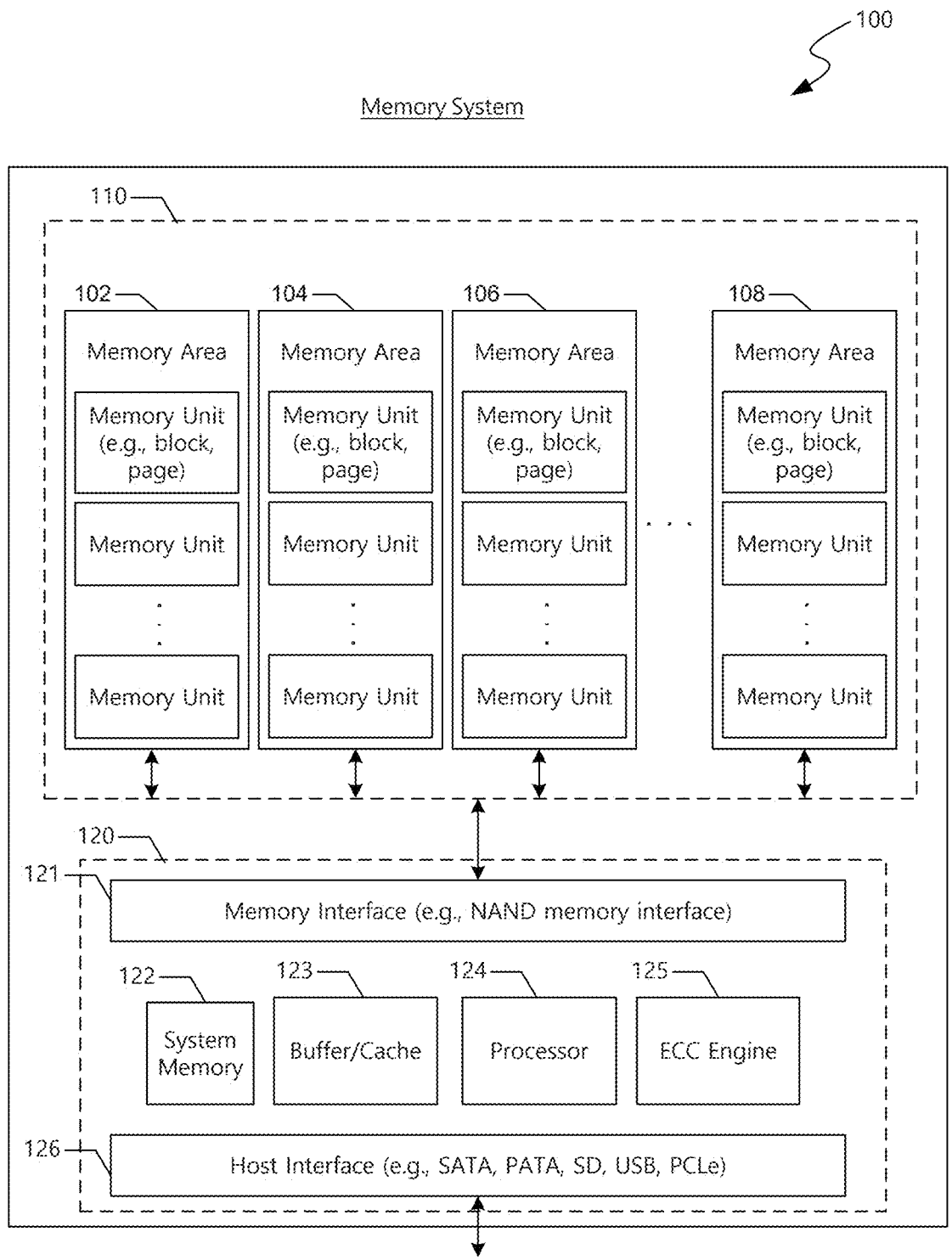
FIG. 1 illustrates an example of a memory system.

FIG. 1 is a block diagram of an example of a memory system 100 implemented based on some embodiments of the disclosed technology. The memory system 100 includes a memory module 110 that can be used to store information for use by other electronic devices or systems. The memory system 100 can be incorporated (e.g., located on a circuit board) in other electronic devices and systems. Alternatively, the memory system 100 can be implemented as an external storage device such as a USB flash drive and a solid-state drive (SSD).

The memory module 110 included in the memory system 100 can include memory areas (e.g., memory arrays) 102, 104, 106, and 108. Each of the memory areas 102, 104, 106, and 108 can be included in a single memory die or in multiple memory dice. The memory die can be included in an integrated circuit (IC) chip.

Each of the memory areas 102, 104, 106, and 108 includes a plurality of memory cells. Read, program, or erase operations can be performed on a memory unit basis. Thus, each memory unit can include a predetermined number of memory cells. The memory cells in a memory area 102, 104, 106, and 108 can be included in a single memory die or in multiple memory dice.

The memory cells in each of memory areas 102, 104, 106, and 108 can be arranged in rows and columns in the memory units. Each of the memory units can be a physical unit. For example, a group of a plurality of memory cells can form a memory unit. Each of the memory units can also be a logical unit. For example, the memory unit can be a block or a page that can be identified by a unique address such as a block address or a page address, respectively. For another example, wherein the memory areas 102, 104, 106, and 108 can include computer memories that include memory banks as a logical unit of data storage, the memory unit can be a bank that can be identified by a bank address. During a read or write operation, the unique address associated with a particular memory unit can be used to access that particular memory unit. Based on the unique address, information can be written to or retrieved from one or more memory cells in that particular memory unit.

The memory cells in the memory areas 102, 104, 106, and 108 can include non-volatile memory cells. Examples of non-volatile memory cells include flash memory cells, phase change random-access memory (PRAM) cells, magnetoresistive random-access memory (MRAM) cells, or other types of non-volatile memory cells. In an example implementation where the memory cells are configured as NAND flash memory cells, the read or write operation can be performed on a page basis. However, an erase operation in a NAND flash memory is performed on a block basis.

Each of the non-volatile memory cells can be configured as a single-level cell (SLC) or multiple-level memory cell. A single-level cell can store one bit of information per cell. A multiple-level memory cell can store more than one bit of information per cell. For example, each of the memory cells in the memory areas 102, 104, 106, and 108 can be configured as a multi-level cell (MLC) to store two bits of information per cell, a triple-level cell (TLC) to store three bits of information per cell, or a quad-level cells (QLC) to store four bits of information per cell. In another example, each of the memory cells in memory area 102, 104, 106, and 108 can be configured to store at least one bit of information (e.g., one bit of information or multiple bits of information), and each of the memory cells in memory area 102, 104, 106, and 108 can be configured to store more than one bit of information.

As shown in FIG. 1, the memory system 100 includes a controller module 120. The controller module 120 includes a memory interface 121 to communicate with the memory module 110, a host interface 126 to communicate with a host (not shown), a processor 124 to execute firmware-level code, and caches and memories 123 and 122, respectively to temporarily or persistently store executable firmware/instructions and associated information. In some implementations, the controller unit 120 can include an error correction engine 125 to perform error correction operation on information stored in the memory module 110. Error correction engine 125 can be configured to detect/correct single bit error or multiple bit errors. In another implementation, error correction engine 125 can be located in the memory module 110.

The host can be a device or a system that includes one or more processors that operate to retrieve data from the memory system 100 or store or write data into the memory system 100. In some implementations, examples of the host can include a personal computer (PC), a portable digital device, a digital camera, a digital multimedia player, a television, and a wireless communication device.

In some implementations, the controller module 120 can also include a host interface 126 to communicate with the host. Host interface 126 can include components that comply with at least one of host interface specifications, including but not limited to, Serial Advanced Technology Attachment (SATA), Serial Attached Small Computer System Interface (SAS) specification, Peripheral Component Interconnect Express (PCIe).

Figure 2:
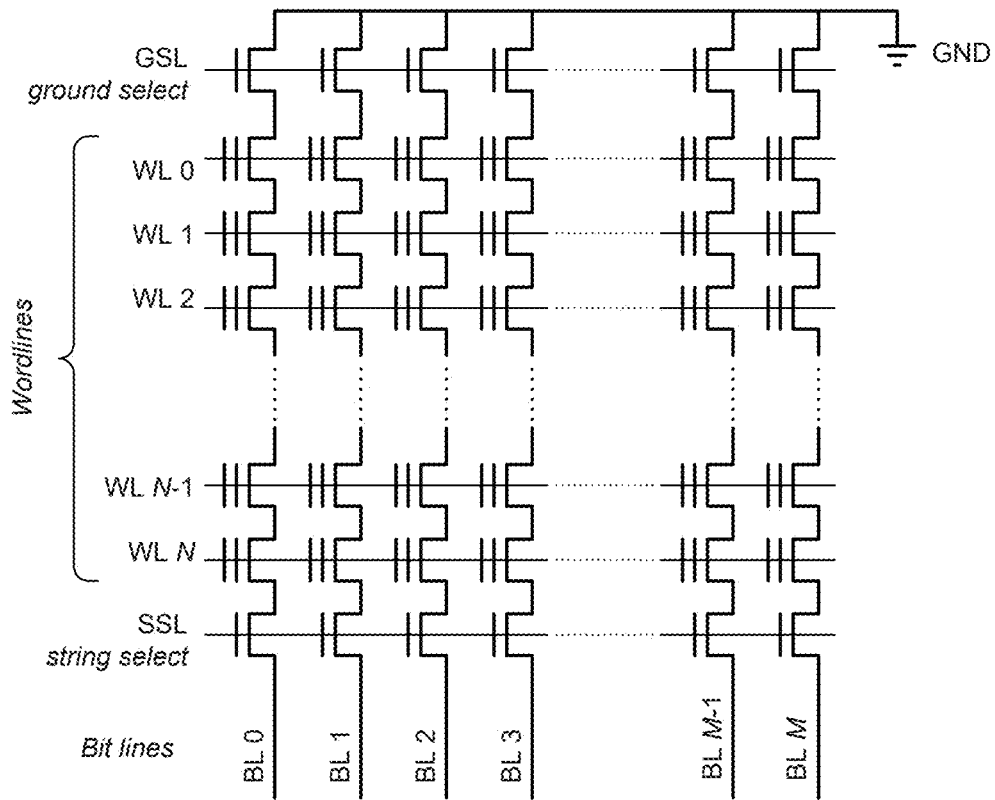
FIG. 2 is an illustration of an example non-volatile memory device.

FIG. 2 illustrates an example of a memory cell array implemented based on some embodiments of the disclosed technology.

In some implementations, the memory cell array can include NAND flash memory array that is partitioned into many blocks, and each block contains a certain number of pages. Each block includes a plurality of memory cell strings, and each memory cell string includes a plurality of memory cells.

In some implementations where the memory cell array is NAND flash memory array, read and write (program) operations are performed on a page basis, and erase operations are performed on a block basis. All the memory cells within the same block must be erased at the same time before performing a program operation on any page included in the block. In an implementation, NAND flash memories may use an even/odd bit-line structure. In another implementation, NAND flash memories may use an all-bit-line structure. In the even/odd bit-line structure, even and odd bit-lines are interleaved along each word-line and are alternatively accessed so that each pair of even and odd bit-lines can share peripheral circuits such as page buffers. In all-bit-line structure, all the bit-lines are accessed at the same time.

Figure 3:
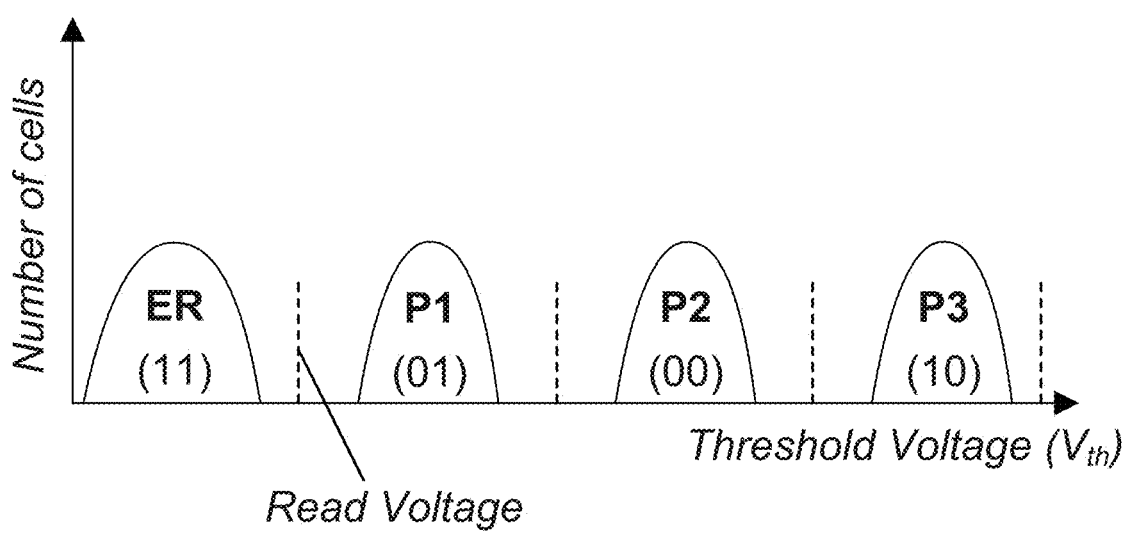
FIG. 3 is an example diagram illustrating the cell voltage level distribution ($V_{th}$) of a non-volatile memory device.

FIG. 3 illustrates an example of threshold voltage distribution curves in a multi-level cell device, wherein the number of cells for each program/erase state is plotted as a function of the threshold voltage. As illustrated therein, the threshold voltage distribution curves include the erase state (denoted "ER" and corresponding to "11") with the lowest threshold voltage, and three program states (denoted "P1", "P2" and "P3" corresponding to "01", "00" and "10", respectively) with read voltages in between the states (denoted by the dotted lines). In some embodiments, each of the threshold voltage distributions of program/erase states has a finite width because of differences in material properties across the memory array.

Although FIG. 3 shows a multi-level cell device by way of example, each of the memory cells can be configured to store any number of bits per cell. In some implementations, each of the memory cells can be configured as a single-level cell (SLC) to store one bit of information per cell, or as a triple-level cell (TLC) to store three bits of information per cell, or as a quad-level cells (QLC) to store four bits of information per cell.

In writing more than one data bit in a memory cell, fine placement of the threshold voltage levels of memory cells is needed because of the reduced distance between adjacent distributions. This is achieved by using incremental step pulse program (ISPP), i.e., memory cells on the same word-line are repeatedly programmed using a program-and-verify approach with a staircase program voltage applied to word-lines. Each programmed state associates with a verify voltage that is used in verify operations and sets the target position of each threshold voltage distribution window.

Read errors can be caused by distorted or overlapped threshold voltage distribution. An ideal memory cell threshold voltage distribution can be significantly distorted or overlapped due to, e.g., program and erase (P/E) cycle, cell-to-cell interference, and data retention errors, which will be discussed in the following, and such read errors may be managed in most situations by using error correction codes (ECCO).

Figure 4:
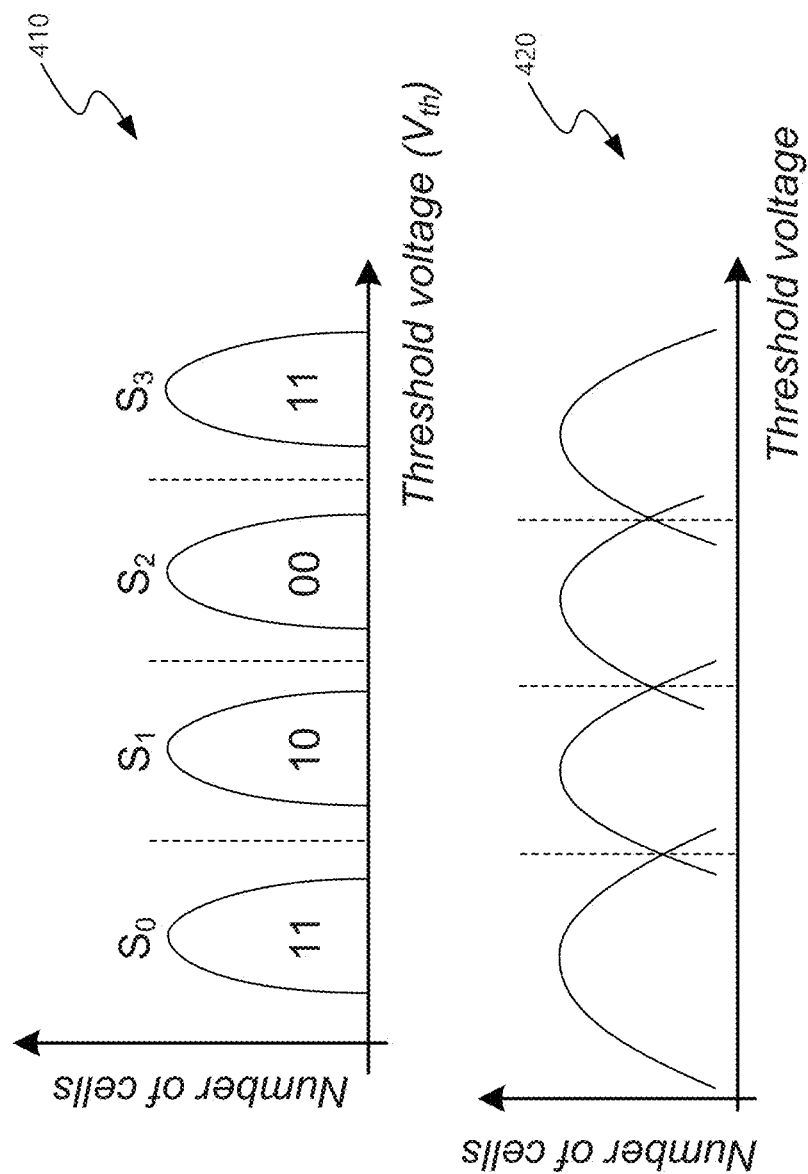
FIG. 4 is another example diagram illustrating the cell voltage level distribution ($V_{th}$) of a non-volatile memory device.

FIG. 4 illustrates an example of ideal threshold voltage distribution curves 410 and an example of distorted threshold voltage distribution curves 420. The vertical axis indicates the number of memory cells that has a particular threshold voltage represented on the horizontal axis.

For n-bit multi-level cell NAND flash memory, the threshold voltage of each cell can be programmed to $2^n$ possible values. In an ideal multi-level cell NAND flash memory, each value corresponds to a non-overlapping threshold voltage window.

Flash memory P/E cycling causes damage to a tunnel oxide of floating gate of a charge trapping layer of cell transistors, which results in threshold voltage shift and thus gradually degrades memory device noise margin. As P/E cycles increase, the margin between neighboring distributions of different programmed states decreases and eventually the distributions start overlapping. The data bit stored in a memory cell with a threshold voltage programmed in the overlapping range of the neighboring distributions may be misjudged as a value other than the original targeted value.

Figure 5:
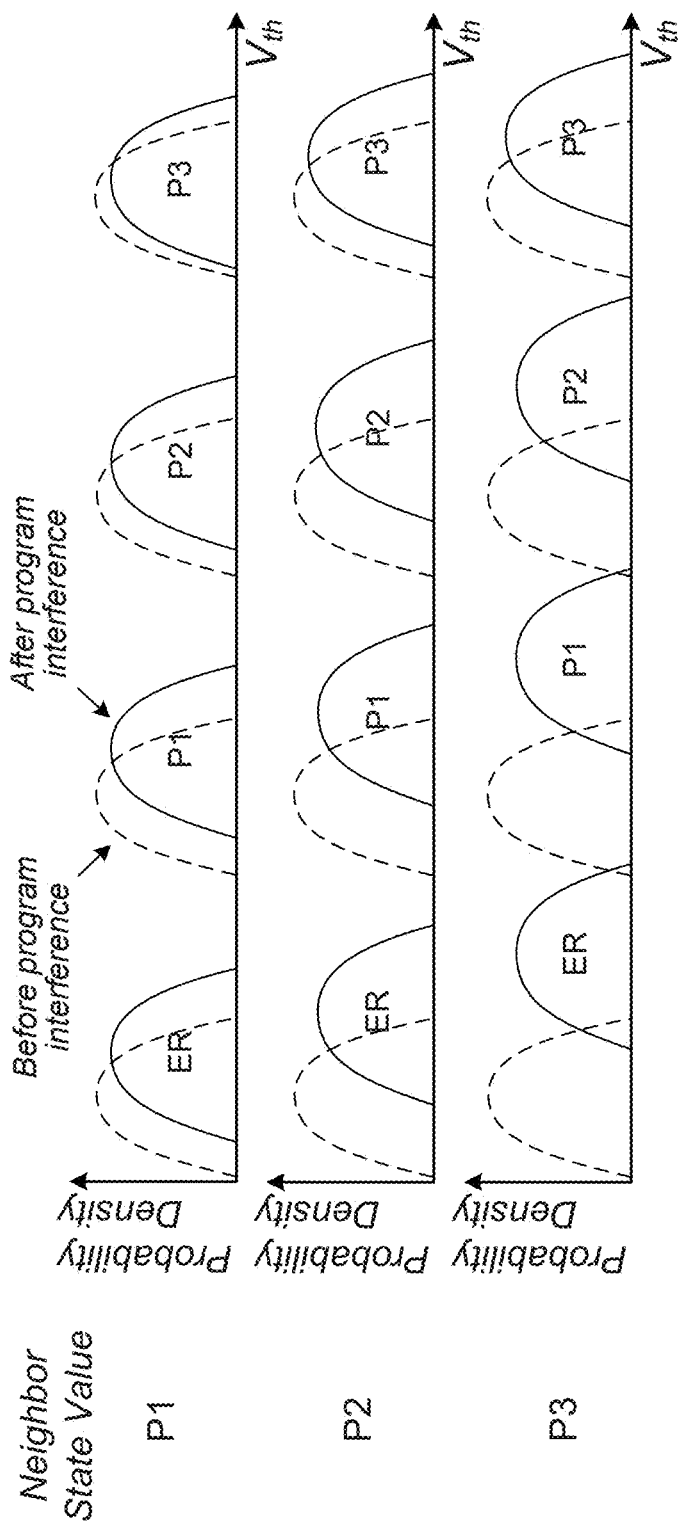
FIG. 5 is an example diagram illustrating the cell voltage level distribution ($V_{th}$) of a non-volatile memory device before and after program interference.

FIG. 5 illustrates an example of a cell-to-cell interference in NAND flash memory. The cell-to-cell interference can also cause threshold voltages of flash cells to be distorted. The threshold voltage shift of one memory cell transistor can influence the threshold voltage of its adjacent memory cell transistor through parasitic capacitance-coupling effect between the interfering cell and the victim cell. The amount of the cell-to-cell interference may be affected by NAND flash memory bit-line structure. In the even/odd bit-line structure, memory cells on one word-line are alternatively connected to even and odd bit-lines and even cells are programmed ahead of odd cells in the same word-line. Therefore, even cells and odd cells experience different amount of cell-to-cell interference. Cells in all-bit-line structure suffer less cell-to-cell interference than even cells in the even/odd bit-line structure, and the all-bit-line structure can effectively support high-speed current sensing to improve the memory read and verify speed.

The dotted lines in FIG. 5 denote the nominal distributions of P/E states (before program interference) of the cells under consideration, and the "neighbor state value" denotes the value that the neighboring state has been programmed to. As illustrated in FIG. 5, if the neighboring state is programmed to P1, the threshold voltage distributions of the cells under consideration shift by a specific amount. However, if the neighboring state is programmed to P2, which has a higher threshold voltage than P1, that results in a greater shift compared to the neighboring state being P1. Similarly, the shift in the threshold voltage distributions is greatest when the neighboring state is programmed to P3.

Figure 6:
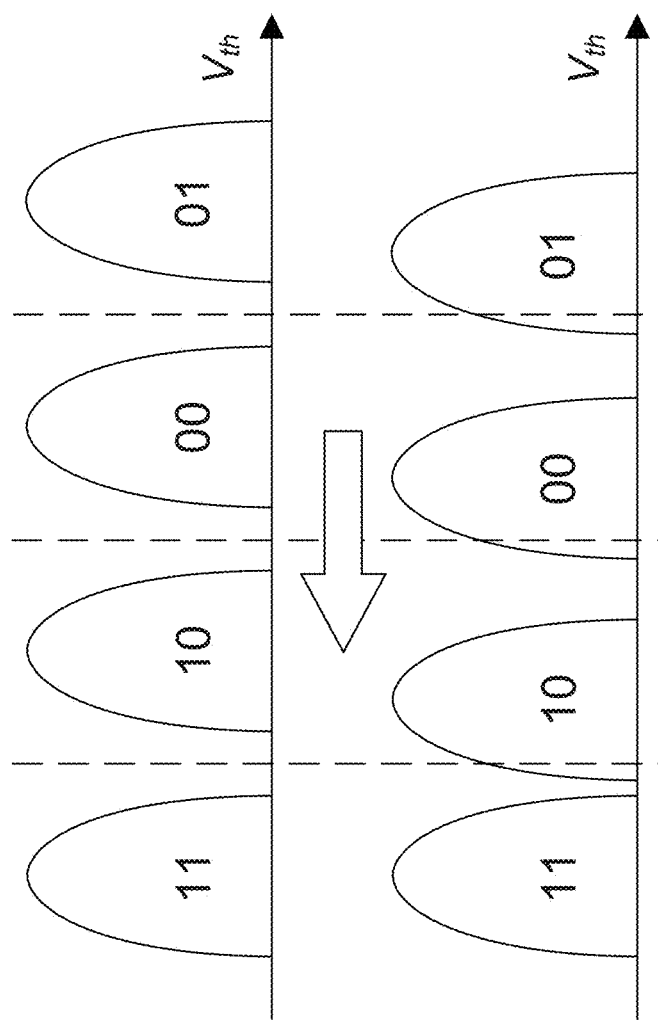
FIG. 6 is an example diagram illustrating the cell voltage level distribution ($V_{th}$) of a non-volatile memory device as a function of the reference voltage.

FIG. 6 illustrates an example of a retention error in NAND flash memory by comparing normal threshold-voltage distribution and shifted threshold-voltage distribution. The data stored in NAND flash memories tend to get corrupted over time and this is known as a data retention error. Retention errors are caused by loss of charge stored in the floating gate or charge trap layer of the cell transistor. Due to wear of the floating gate or charge trap layer, memory cells with more program erase cycles are more likely to experience retention errors. In the example of FIG. 6, comparing the top row of voltage distributions (before corruption) and the bottom row of distributions (contaminated by retention error) reveals a shift to the left.

In NAND-based storage systems (e.g., the examples illustrated in FIGS. 1-6) and solid-state drive (SSD) applications, and as discussed above, ECC engines include both the bit-flipping (BF) decoder and the min-sum (MS) decoder because they have different characteristics that support varying use cases. Bit-flipping (BF) decoders are typically configured to compute a flipping energy of variable nodes based on messages received from the neighboring check nodes and compare it to a threshold to decide whether the value of the variable node should be flipped.

For typical SSD applications, most page reads (more than 99%) are by the BF decoder due to it being a fast decoder. That is, the throughput per silicon area in a BF decoder is much greater than in an MS decoder. However, the BF decoder is known to have relatively weak error correction capabilities compared to the MS decoder, and if a read request cannot be decoded by the BF decoder, it will be decoded by the MS decoder. Embodiments of the disclosed technology provide an MS decoder that works in two modes: a full mode that operates similar to a normal MS decoder (e.g., with regard to error correction capabilities) and a light mode that doubles the processing speed (and consequently, the doubles the throughput) of the full mode, which can be used when the throughput of the BF decoder proves insufficient.

In most storage applications, the min-sum (MS) decoding algorithm is typically the last tier of decoding that guarantees the reliability requirement. To that end, embodiments of the disclosed technology provide the following features:

Groups of variable nodes (VNs) and groups of check nodes (CNs) are processed in parallel in each decoding iteration to meet the throughput requirement. Parallel processing can be easily implemented for quasi-cyclic LDPC (QC-LDPC) codes, which favor their use in most memory and storage applications.

Fast converging scheduling algorithms (e.g., a vertically shuffled scheduling (VSS) operation) are used, which improve message propagation and reduces the average number of iterations required for decoding. The VSS operation typically has better convergence than typical flooding scheduling algorithms.

Gate counts are reduced (thereby reducing the silicon area) by use fixed-point representations of messages in the MS decoder, e.g., each message from a variable node (VN) or a check node (CN) is quantized to an L-bit message, with L being a positive integer.

Gate counts are further reduced by storing only a subset of the variable node to check node (V2C) messages, and using an array of minimum data (denoted cnu-data) stored in memory shift registers to approximately generate check node to variable node (C2V) messages. It is noted that the degree of CNs is typically much larger than the degree of VNs (e.g., roughly 10×, or an order of magnitude).

In some embodiments, the cnu-data is [min1, min2, min1_index, min2_index] where min1 is the absolute value of the smallest incoming message (e.g., an L−1 bit message), min2 is the absolute value of the second smallest incoming message (e.g., an L−1 bit message), min1_index is the index of the smallest incoming message, and min2_index is the index of the second smallest incoming message. The number of bits required for representing min1_index and min2_index depends on the largest weight of the CNs, and it is assumed that K bits are needed to represent each of the indices. Thus, the total number of bits needed to represent the cnu-data for each CN can be represented as [L−1, L−1, K, K].

In some embodiments, an example hardware implementation of the MS decoding algorithm in the full mode assumes that i ($0 \leq i \leq i_{max}$) represents the iteration number, $d_j^{(i)}$ denotes the decision of variable node j of the i-th iteration, and $d^{(i)} = [d_0^{(i)}, d_1^{(i)}, \ldots, d_{N-1}^{(i)}]$. Furthermore, H is the parity check matrix, and $s^{(i)} = [d_0^{(i)}, d_1^{(i)}, \ldots, d_{N-1}^{(i)}]H^T$ is the syndrome at iteration i, and $cs^{(i)}$ is the corresponding checksum. The decoder input for each VN is the channel likelihood, $LCH = [l_0^{(i)}, l_1^{(i)}, \ldots, l_{N-1}^{(i)}]$, where each value is an m-bit quantized integer value of a floating-point channel likelihood value. It is further assumed that $d^{(-1)} = [d_0^{(-1)}, d_1^{(-1)}, \ldots, d_{N-1}^{(-1)}] = \text{sign}(LCH)$.

The MS decoding algorithm includes the following operations:

Step 0. Initialization.
  0.1 Set i=0, calculate $s^{(-1)}$, initialize V2C message $\mu_{v \to c}$ as LCH value of $l_v$.
  0.2 For all $\mu_{v \to c}$, store their 1-bit sign value in an array of v2c_sign.
  0.3 Initialize cnu_data.
Step 1. i=i+1, if reach max iteration, stop decoding. Otherwise, go to Step 2.
Step 2. For each circulant column (ccol with size Q):
  2.1 For each variable node v in ccol (implemented in parallel in hardware):
    2.1.1 Compute all the C2V messages from all check nodes (CNs) connected to variable node v using only cnu_data.
    2.1.2 Compute intrinsic message ($\mu_{in}(v)$) for v ($\mu_{in}(v) = \Sigma \mu_{v \to c} + lch_v$)
  2.2 Compute $d^{(i)}(ccol) = \text{sign}(\mu_{in}(ccol))$, and update $s^{(i)}$, $cs^{(i)}$.
  2.3 If $cs^{(i)} = 0$:
    2.3.1 Declare decoding success and stop.
  2.4 Else
    2.4.1 Compute V2C messages for all the CNs connected to VNs in ccol, and update the sign of each V2C in array v2c_sign.
    2.4.2 Update cnu_data for all the CNs connected to VNs in ccol.
      2.4.2.1 Update min1 value and min1_index if needed.
      2.4.2.2 Update min2 value and min2_index if needed.
      2.4.2.3 Update sign-bit info based on latest ($s^{(i)}$).
Step 3. Go to Step 1.

If the hardware implementation of the MS decoder cannot handle the throughput requirement, processing speed may be increased, e.g., increasing the number of VNs and CNs processed in parallel. Existing implementations, which add additional VNs and CNs to enable greater parallel processing, require an increased gate count (e.g., an increase of roughly 50% compared to the original gate count) to support the higher throughput requirement. However, embodiments of the disclosed technology provide a lower complexity implementation that can meet the increased throughput requirement. As discussed above, the MS decoder is configured to operate in a full mode, in which the MS decoder targets highest correction capability to meet the reliability requirement, or a light mode, in which the processing speed of the decoder is doubled.

In some embodiments, it is assumed that the MS decoder operating in the full mode processes Q bits in parallel. In an example, Q is a multiple of the circulant size in QC-LDPC codes. Given the cnu-data format of [L−1, L−1, K, K], the number of bits stored per cnu-data is equal to 2K+2L−2. If d is the degree of the bits processed in parallel, then a total of Q·d·(2K+2L−2) bits of cnu-data is stored in registers in the decoding cycle.

In some embodiments, the MS decoder operating in the light mode processes 2Q bits in parallel during each clock cycle of the decoding process. To reduce the cnu-data that is stored in the registers, the following modifications are implemented:

Reduce the bit-width needed by min1 and min2 by storing the sign bit of each message separately, i.e., min1 and min2 are stored using L−2 bits each.

Reduce the bit-width needed for storing min2 by storing (min2−min1) instead of min2, which requires one less bit to store (as compared to min2).

Figure 7:
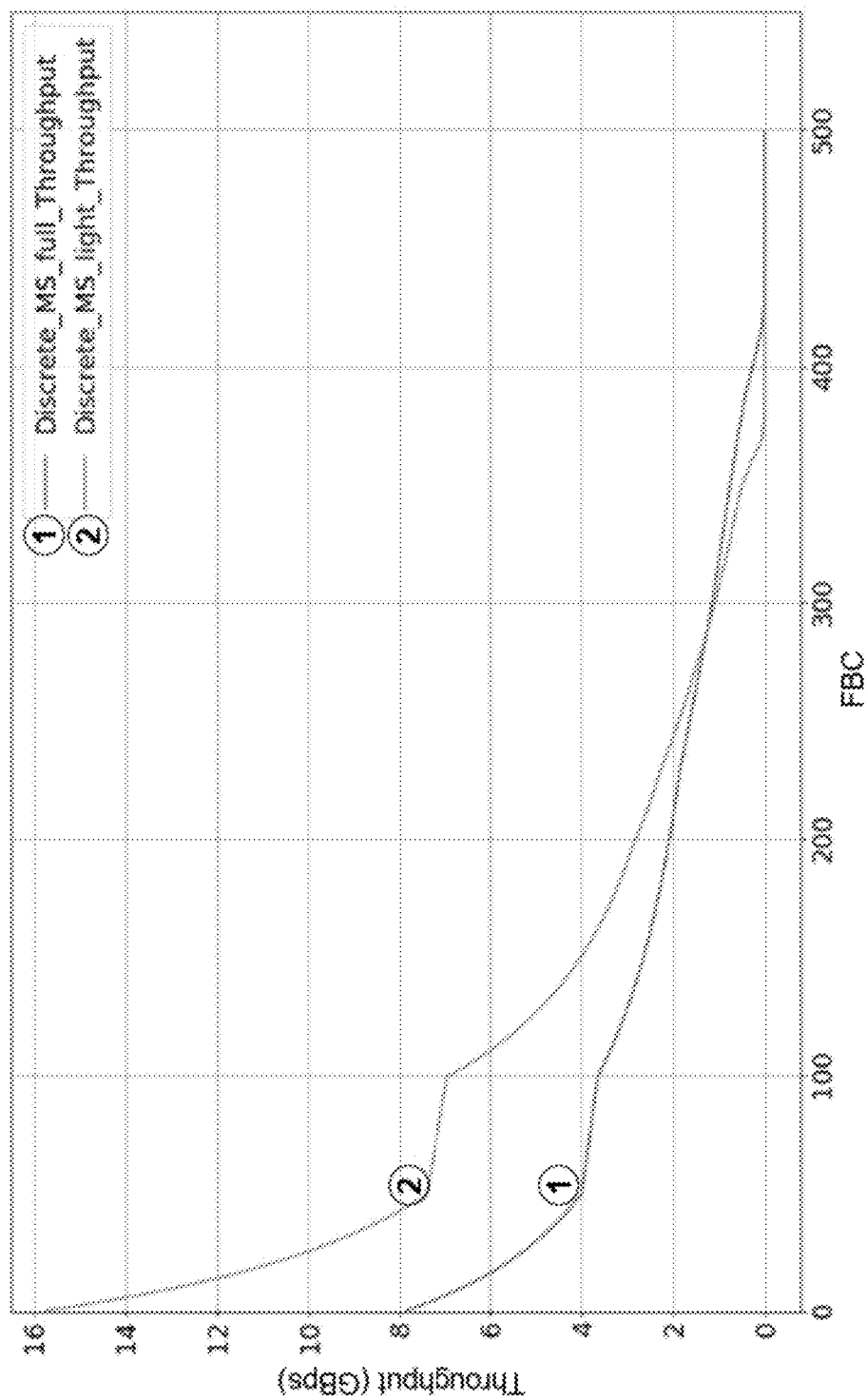
FIG. 7 illustrates an example simulation result that shows the efficacy of some embodiments in accordance with the disclosed technology.

Ignore min2_index in the light mode, thereby saving K bits per cnu-data. The lack of min2_index in the decoding process increases the error floor, but does not significantly impact the waterfall portion of the codeword failure rate (CFR) curve, as shown in FIG. 7.

Thus, the reduced cnu-data that can be stored is [min1, min2−min1, min1_index], which requires [L−2, L−3, K]=K+2L−5 bits. Again, assuming that d is the degree of the bits processed in parallel, a total of 2·Q·d·(K+2L−5) bits of cnu-data is stored in registers in the decoding cycle for the light mode.

In an example, it is assumed that 4-bit quantization is used, i.e., L=4. Herein, the number of bits stored in the full mode is Q·d·(2K+2L−2)=Q d (2K+6), and in the light mode, the number of bits stored is 2·Q·d·(K+2L−5)=2·Q·d·(K+3), which is identical to the bit storage requirement in the full mode. This means the registers used to store bits when processing Q bits in parallel in the full mode can be used (shared) for storing the cnu-data in light mode when processing 2Q bits in parallel. This register sharing also advantageously reduces the additional gate count needed to process 2Q bits in parallel.

In some embodiments, another example hardware implementation of the MS decoding algorithm (with the same assumptions as previously described) includes the following operations:

Step 0. Initialization
    0.1 Set i=0, calculate $s^{(-1)}$, $cs^{(-1)}$, initialize V2C message $\mu_{v \to c}$ as the channel likelihood (LCH) value of $l_v$.
    0.2 For all $\mu_{v \to c}$ store their 1-bit sign value in an array of v2c_sign.

Step 1. If $cs^{(-1)} < cs_{th}$, set mode=light, otherwise mode=full
    1.1 Set size of parallel bits processed to Q for full mode, and 2Q for light mode
    1.2 Initialize cnu_data based on the mode and go to Step 2

Step 2. i=i+1, if reach max iteration, stop decoding. Otherwise, go to Step 3

Step 3. For each Z bits of VNs:
    3.1 For each variable node v in ccol (implemented in parallel in hardware):
        3.1.1 Compute all the C2V messages from all check nodes (CNs) connected to variable node v using only cnu_data.
        3.1.2 Compute intrinsic message ($\mu_{in}(v)$) for v ($\mu_{in}(v) = \Sigma \mu_{c \to v} + lch_v$)
    3.2 Compute $d^{(i)}(ccol) = sign(\mu_{in}(ccol))$, and update $s^{(i)}$, $cs^{(i)}$.
    3.3 If $cs^{(i)}=0$:
        3.3.1 Declare decoding success and stop.
    3.4 Else
        3.4.1 Compute V2C messages for all the CNs connected to VNs in ccol, and update the sign of each V2C in array v2c_sign.
        3.4.2 Update cnu_data for all the CNs connected to VNs in ccol.
            3.4.2.1 Update min1 value and min1_index if needed.
            3.4.2.2 Update min2 value and min2_index if needed.
            3.4.2.3 Update sign-bit info based on latest ($s^{(i)}$).

Step 4. Go to Step 2.

As shown in FIG. 7, which illustrates example simulation results comparing the performance of the MS decoder operating in full mode and light mode, the throughput is almost doubled when using the light mode (compared to the full mode). The disclosed light mode embodiments can handle the majority of low-FBC reads and only increases the gate count by less than 30% (compared to at least 50% for a conventional increase in throughput by adding more VNs and CNs at the expense of more silicon area).

Figure 8:
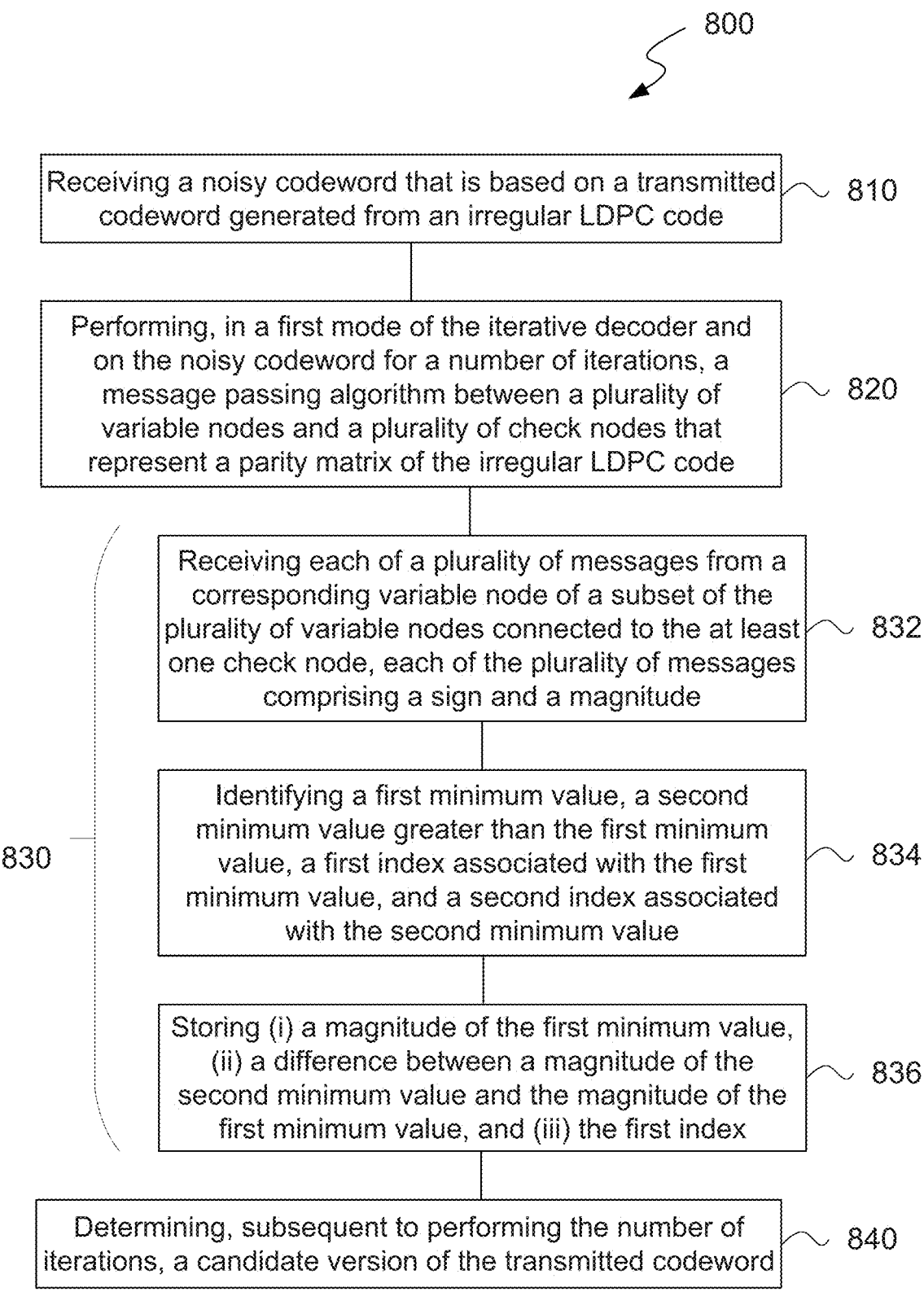
FIG. 8 illustrates a flowchart of an example method for improving the performance of a memory device.

FIG. 8 illustrates a flowchart of an example method 800 for improving the performance of a memory device. The method 800 includes, at operation 810, receiving a noisy codeword that is based on a transmitted codeword generated from an irregular LDPC code.

The method 800 includes, at operation 820, performing, in a first mode of the iterative decoder and on the noisy codeword for a number of iterations, a message passing algorithm between a plurality of variable nodes and a plurality of check nodes that represent a parity matrix of the irregular LDPC code. In an example, the first mode corresponds to the light mode that supports double the throughput of the full mode.

The method 800 includes, at operation 830, and as part of performing operation 820, at least one check node of the plurality of check nodes performing operations 832 through 836.

At operation 832, the method includes receiving each of a plurality of messages from a corresponding variable node of a subset of the plurality of variable nodes connected to the at least one check node, each of the plurality of messages comprising a sign and a magnitude.

At operation 834, the method includes identifying a first minimum value, a second minimum value greater than the first minimum value, a first index associated with the first minimum value, and a second index associated with the second minimum value. In an example, the first minimum value corresponds to a smallest magnitude amongst the plurality of messages, the second minimum value corresponds to a second smallest magnitude amongst the plurality of messages, the first index is of the corresponding variable node associated with the first minimum value, and the second index is of the corresponding variable node associated with the second minimum value.

At operation 836, the method includes storing (i) a magnitude of the first minimum value, (ii) a difference between a magnitude of the second minimum value and the magnitude of the first minimum value, and (iii) the first index.

The method 800 includes, at operation 840, determining, subsequent to performing the number of iterations, a candidate version of the transmitted codeword.

In some embodiments, the first minimum value is an L−1 bit message, the second minimum value is an L−1 bit message, the first index is a K-bit message, the second index is a K-bit message, and L and K are positive integers.

In some embodiments, K is based on a largest weight of a check node.

In some embodiments, the magnitude of the first minimum value is an L−2 bit message, the difference between the magnitude of the second minimum value and the magnitude of the first minimum value is an L−3 bit message, and a sign of the first minimum value and a sign of the second minimum value are stored separately.

In some embodiments, and in a second mode of the iterative decoder, the at least one check node is configured to store (i) the first minimum value, (ii) the second minimum value, (iii) the first index for the first minimum value, and (iv) the second index for the second minimum value. In an example, the second mode corresponds to the full mode discussed above.

In some embodiments, the iterative decoder is configured to process Q bits in parallel in the second mode and 2Q bits in parallel in the first mode, and where Q is a positive integer that is a multiple of a circulant of the irregular LDPC code.

In some embodiments, the message passing algorithm comprises a vertically shuffled scheduling (VSS) operation.

Figure 9:
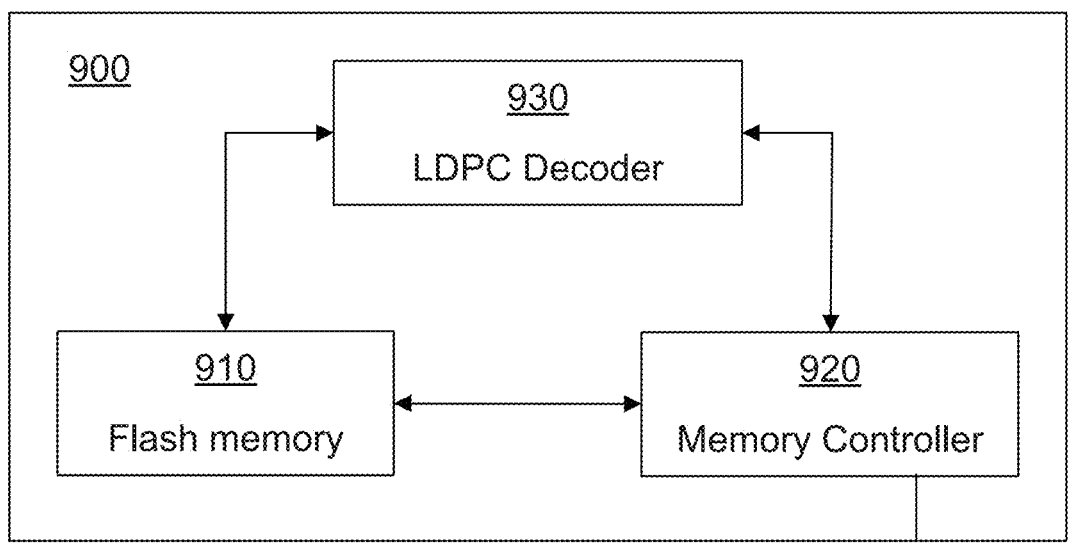
FIG. 9 is an example diagram illustrating a storage device that can be configured to implement the described embodiments.

FIG. 9 is an example diagram illustrating a storage device that can be configured to implement the described embodiments. Referring to FIG. 9, a data storage device 900 may include a flash memory 910, a memory controller 920, and an LDPC decoder 930. The memory controller 920 may control the flash memory 910 and the LDPC decoder 930 in response to control signals input from the outside of the data storage device 900. In the data storage device 900, the flash memory 910 may be configured the same or substantially the same as a nonvolatile memory device. That is, the flash memory 910 may read data from selected memory cells using different read voltages to output it to the memory controller 920.

In some embodiments, the data storage device 900 may be a memory card device, an SSD device, a multimedia card device, an SD card, a memory stick device, an HDD device, a hybrid drive device, or an USB flash device. For example, the data storage device 900 may be a card which satisfies the standard for user devices such as a digital camera, a personal computer, and so on.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for improving performance of an iterative decoder in a non-volatile memory, comprising:
    receiving a noisy codeword that is based on a transmitted codeword generated from an irregular low-density parity-check (LDPC) code;
    performing, in a first mode of the iterative decoder and on the noisy codeword for a number of iterations, a message passing algorithm between a plurality of variable nodes and a plurality of check nodes that represent a parity matrix of the irregular LDPC code,
        wherein, as part of performing the message passing algorithm, at least one check node of the plurality of check nodes is configured to:
            receive each of a plurality of messages from a corresponding variable node of a subset of the plurality of variable nodes connected to the at least one check node, each of the plurality of messages comprising a sign and a magnitude,
            identify (i) a first minimum value corresponding to a smallest magnitude amongst the plurality of messages, (ii) a second minimum value, greater than the first minimum value, corresponding to a second smallest magnitude amongst the plurality of messages, (iii) a first index of the corresponding variable node associated with the first minimum value, and (iv) a second index of the corresponding variable node associated with the second minimum value, and store (i) a magnitude of the first minimum value, (ii) a difference between a magnitude of the second minimum value and the magnitude of the first minimum value, and (iii) the first index for the first minimum value;

determining, subsequent to performing the number of iterations, a candidate version of the transmitted codeword.

2. The method of claim 1, wherein the first minimum value is an L−1 bit message, the second minimum value is an L−1 bit message, the first index is a K-bit message, and the second index is a K-bit message, and wherein L and K are positive integers.

3. The method of claim 2, wherein K is based on a largest weight of a check node.

4. The method of claim 2, wherein the magnitude of the first minimum value is an L−2 bit message, wherein the difference between the magnitude of the second minimum value and the magnitude of the first minimum value is an L−3 bit message, and wherein a sign of the first minimum value and a sign of the second minimum value are stored separately.

5. The method of claim 2, wherein, in a second mode of the iterative decoder, the at least one check node is configured to store (i) the first minimum value, (ii) the second minimum value, (iii) the first index for the first minimum value, and (iv) the second index for the second minimum value.

6. The method of claim 5, wherein the iterative decoder is configured to process Q bits in parallel in the second mode and 2Q bits in parallel in the first mode, and wherein Q is a positive integer that is a multiple of a circulant of the irregular LDPC code.

7. The method of claim 1, wherein the message passing algorithm comprises a vertically shuffled scheduling (VSS) operation.

8. A system improving performance of an iterative decoder in a non-volatile memory device, comprising:

a processor and a memory including instructions stored thereupon, wherein the instructions upon execution by the processor cause the processor to:

receive a noisy codeword that is based on a transmitted codeword generated from an irregular low-density parity-check (LDPC) code;

perform, in a first mode of the iterative decoder and on the noisy codeword for a number of iterations, a message passing algorithm between a plurality of variable nodes and a plurality of check nodes that represent a parity matrix of the irregular LDPC code, wherein, as part of performing the message passing algorithm, at least one check node of the plurality of check nodes is configured to:

receive each of a plurality of messages from a corresponding variable node of a subset of the plurality of variable nodes connected to the at least one check node, each of the plurality of messages comprising a sign and a magnitude, identify (i) a first minimum value corresponding to a smallest magnitude amongst the plurality of messages, (ii) a second minimum value, greater than the first minimum value, corresponding to a second smallest magnitude amongst the plurality of messages, (iii) a first index of the corresponding variable node associated with the first minimum value, and (iv) a second index of the corresponding variable node associated with the second minimum value, and store (i) a magnitude of the first minimum value, (ii) a difference between a magnitude of the second minimum value and the magnitude of the first minimum value, and (iii) the first index for the first minimum value;

determine, subsequent to performing the number of iterations, a candidate version of the transmitted codeword.

9. The system of claim 8, wherein the first minimum value is an L−1 bit message, the second minimum value is an L−1 bit message, the first index is a K-bit message, and the second index is a K-bit message, and wherein L and K are positive integers.

10. The system of claim 9, wherein K is based on a largest weight of a check node.

11. The system of claim 9, wherein the magnitude of the first minimum value is an L−2 bit message, wherein the difference between the magnitude of the second minimum value and the magnitude of the first minimum value is an L−3 bit message, and wherein a sign of the first minimum value and a sign of the second minimum value are stored separately.

12. The system of claim 9, wherein, in a second mode of the iterative decoder, the at least one check node is configured to store (i) the first minimum value, (ii) the second minimum value, (iii) the first index for the first minimum value, and (iv) the second index for the second minimum value.

13. The system of claim 12, wherein the iterative decoder is configured to process Q bits in parallel in the second mode and 2Q bits in parallel in the first mode, and wherein Q is a positive integer that is a multiple of a circulant of the irregular LDPC code.

14. The system of claim 8, wherein the message passing algorithm comprises a vertically shuffled scheduling (VSS) operation.

15. A non-transitory computer-readable storage medium having instructions stored thereupon for improving performance of an iterative decoder in a non-volatile memory device, comprising:

instructions for receiving a noisy codeword that is based on a transmitted codeword generated from an irregular low-density parity-check (LDPC) code;

instructions for performing, in a first mode of the iterative decoder and on the noisy codeword for a number of iterations, a message passing algorithm between a plurality of variable nodes and a plurality of check nodes that represent a parity matrix of the irregular LDPC code, wherein, as part of performing the message passing algorithm, at least one check node of the plurality of check nodes is configured to:

receive each of a plurality of messages from a corresponding variable node of a subset of the plurality of variable nodes connected to the at least one check node, each of the plurality of messages comprising a sign and a magnitude, identify (i) a first minimum value corresponding to a smallest magnitude amongst the plurality of messages, (ii) a second minimum value, greater than the first minimum value, corresponding to a second smallest magnitude amongst the plurality of messages, (iii) a first index of the corresponding variable node associated with the first minimum value, and (iv) a second index of the corresponding variable node associated with the second minimum value, and store (i) a magnitude of the first minimum value, (ii) a difference between a magnitude of the second minimum value and the magnitude of the first minimum value, and (iii) the first index for the first minimum value;

instructions for determining, subsequent to performing the number of iterations, a candidate version of the transmitted codeword.

16. The non-transitory computer-readable storage medium of claim 15, wherein the first minimum value is an L−1 bit message, the second minimum value is an L−1 bit message, the first index is a K-bit message, and the second index is a K-bit message, and wherein L and K are positive integers.

17. The non-transitory computer-readable storage medium of claim 16, wherein K is based on a largest weight of a check node.

18. The non-transitory computer-readable storage medium of claim 16, wherein the magnitude of the first minimum value is an L−2 bit message, wherein the difference between the magnitude of the second minimum value and the magnitude of the first minimum value is an L−3 bit message, and wherein a sign of the first minimum value and a sign of the second minimum value are stored separately.

19. The non-transitory computer-readable storage medium of claim 16, wherein, in a second mode of the iterative decoder, the at least one check node is configured to store (i) the first minimum value, (ii) the second minimum value, (iii) the first index for the first minimum value, and (iv) the second index for the second minimum value.

20. The non-transitory computer-readable storage medium of claim 15, wherein the message passing algorithm comprises a vertically shuffled scheduling (VSS) operation.

* * * * *